United States Patent
Matsuki et al.

(10) Patent No.: US 9,765,417 B2
(45) Date of Patent: Sep. 19, 2017

(54) LOW-YIELD RATIO HIGH-STRENGTH ELECTRIC RESISTANCE WELDED STEEL PIPE, STEEL STRIP FOR ELECTRIC RESISTANCE WELDED STEEL PIPES, AND METHODS OF MANUFACTURING THEM

(75) Inventors: Yasuhiro Matsuki, Kawasaki (JP); Tomohiro Inoue, Tokyo (JP)

(73) Assignee: JFE Steel Corporation (JP)

(*) Notice: Subject to any disclaimer, the term of this patent is extended or adjusted under 35 U.S.C. 154(b) by 237 days.

(21) Appl. No.: 14/390,514

(22) PCT Filed: Apr. 9, 2012

(86) PCT No.: PCT/JP2012/060194
§ 371 (c)(1),
(2), (4) Date: Oct. 22, 2014

(87) PCT Pub. No.: WO2013/153676
PCT Pub. Date: Oct. 17, 2013

(65) Prior Publication Data
US 2015/0068638 A1    Mar. 12, 2015

(51) Int. Cl.
| | |
|---|---|
| *C22C 38/06* | (2006.01) |
| *C22C 38/04* | (2006.01) |
| *C22C 38/02* | (2006.01) |
| *C22C 38/00* | (2006.01) |
| *C22C 38/16* | (2006.01) |
| *B23K 11/16* | (2006.01) |
| *B23K 11/087* | (2006.01) |
| *F16L 9/02* | (2006.01) |
| *C22C 38/18* | (2006.01) |

(Continued)

(52) U.S. Cl.
CPC .......... *C22C 38/06* (2013.01); *B23K 11/0873* (2013.01); *B23K 11/16* (2013.01); *C21D 8/0226* (2013.01); *C21D 8/105* (2013.01); *C21D 9/08* (2013.01); *C22C 38/001* (2013.01); *C22C 38/002* (2013.01); *C22C 38/02* (2013.01); *C22C 38/04* (2013.01); *C22C 38/08* (2013.01); *C22C 38/16* (2013.01); *C22C 38/18* (2013.01); *F16L 9/02* (2013.01); *F16L 9/165* (2013.01); *Y10T 428/12951* (2015.01); *Y10T 428/12972* (2015.01); *Y10T 428/13* (2015.01)

(58) Field of Classification Search
CPC ......... C22C 38/06; C22C 38/16; C22C 38/04; C22C 38/02; C22C 38/002; C22C 38/001; C22C 38/08; C22C 38/18; Y10T 428/12951; Y10T 428/12972; Y10T 428/13

See application file for complete search history.

(56) References Cited

FOREIGN PATENT DOCUMENTS

| | | |
|---|---|---|
| JP | 60-13024 | 1/1985 |
| JP | 63-100126 | 5/1988 |

(Continued)

OTHER PUBLICATIONS

Machine Translation, Yasuhiro et al., JP 2011-089152, May 2011.*

*Primary Examiner* — Michael E La Villa
(74) *Attorney, Agent, or Firm* — DLA Piper LLP (US)

(57) ABSTRACT

A low-yield ratio high-strength electric resistance welded steel pipe has a yield ratio of 80% or less and a TS of 655 MPa or more. A steel material has a composition containing 0.38% to 0.45% C, 0.1% to 0.3% Si, 1.0% to 1.8% Mn, 0.03% or less P, 0.03% or less S, 0.01% to 0.07% sol. Al, and 0.01% or less N on a mass basis.

15 Claims, 2 Drawing Sheets

(51) Int. Cl.
*C22C 38/08* (2006.01)
*C21D 8/02* (2006.01)
*C21D 8/10* (2006.01)
*C21D 9/08* (2006.01)
*F16L 9/16* (2006.01)

(56) References Cited

FOREIGN PATENT DOCUMENTS

| JP | 2004-217992 | 8/2004 |
| JP | 2011-89152 | 5/2011 |

* cited by examiner

LOW-YIELD RATIO HIGH-STRENGTH ELECTRIC RESISTANCE WELDED STEEL PIPE, STEEL STRIP FOR ELECTRIC RESISTANCE WELDED STEEL PIPES, AND METHODS OF MANUFACTURING THEM

TECHNICAL FIELD

This disclosure relates to high-strength electric resistance welded steel pipes for oil country tubular goods (OCTG) and particularly relates to the increase in quality homogeneity of a high-strength electric resistance welded steel pipe corresponding to API 5CT K55. The term "high strength" as used herein refers to a yield strength YS of 379 MPa to 552 MPa and a tensile strength TS of 655 MPa or more. In addition, the term "low yield ratio" as used herein refers to a yield ratio of 80% or less.

BACKGROUND ART

In electric resistance welded steel pipes manufactured such that first a steel strip is continuously formed and then subjected to electric resistance welding, large bending strain is introduced during the pipe manufacturing, causing a significant increase in yield strength YS after the pipe manufacturing. Therefore, a precipitation-hardened steel sheet having such a tendency that the yield strength YS is significantly increased by applied strain has been conventionally incapable of being used as a material for low-yield ratio high-strength electric resistance welded steel pipes without heat treatment subsequent to pipe manufacturing. Therefore, a solid solution-hardened steel sheet with a composition system having an increased C content and an increased Mn content has been conventionally used as a material for low-yield ratio high-strength electric resistance welded steel pipes.

For example, Japanese Unexamined Patent Application Publication No. 2004-217992 describes a method of manufacturing an electric resistance welded steel pipe such that a base steel pipe having a composition containing 0.0002% to 0.5% C, 0.003% to 3.0% Si, 0.003% to 3.0% Mn, 0.002% to 2.0% Al, 0.003% to 0.15% P, 0.03% or less S, and 0.01% or less N is heated to a temperature not lower than the $Ae_3$ point and not higher than 1,300° C., subjected to reducing rolling at a finishing rolling temperature of (the $Ae_3$ point—50° C.) or higher, subjected to cooling within 2 seconds thereafter, cooled to (the $Ae_3$ point—70° C.) at a rate of 5° C./sec. to 20° C./sec., and cooled to (the $Ae_3$ point—150° C.) at a rate of 1.0° C./sec. to 20° C./sec. This allows a steel pipe which has a pipe body having a fine, uniform grain size, with only the surface layer further refined, and an excellent strength-ductility balance to be obtained.

However, in Japanese Unexamined Patent Application Publication No. 2004-217992, heating a pipe body and subjecting the pipe body to reducing rolling are essential requirements. Since the pipe body is heated, there are problems that surface quality is low and production cost is significantly high.

Furthermore, to ensure high strength for a solid solution-hardened steel sheet, the amounts of C and Mn need to be large. Therefore, there are problems that quality such as strength varies significantly due to unavoidable fluctuation in hot rolling conditions, the inner wrap of a coil tends to be softer than the outer wrap after coiling, and quality such as strength varies significantly depending on coil locations. In particular, in heavy-gauge steel sheets (thick products) with a thickness of 10 mm or more, this tendency is remarkable. Therefore, it is difficult to stably manufacture a high-strength electric resistance welded steel pipe having a small variation in quality from a solid solution-hardened steel sheet without heating during pipe manufacturing, and that is particularly difficult in heavy gauges. In addition, heating a pipe during pipe manufacturing requires a heating facility and causes a reduction in productivity. Furthermore, there is a problem in that since scale is formed by the heating, many surface defects are caused by the contact of steel with a roll to deteriorate the surface condition. Therefore, a method capable of manufacturing a low-yield ratio high-strength electric resistance welded steel pipe without heating has been strongly desired.

SUMMARY

We thus provide:

(1) A method of manufacturing an low-yield ratio high-strength electric resistance welded steel pipe with excellent quality homogeneity includes a hot rolling step in which a steel material is heated and is formed into a hot-rolled steel strip by rough rolling and finish rolling and the hot-rolled steel strip is coiled and a pipe-manufacturing step in which the coiled hot-rolled steel strip is continuously supplied and is formed into a substantially cylindrical open pipe by roll forming and circumferential end portions of the open pipe are aligned against each other and are subjected to electric resistance welding. The steel material has a composition containing 0.38% to 0.45% C, 0.1% to 0.3% Si, 1.0% to 1.8% Mn, 0.03% or less P, 0.03% or less S, 0.01% to 0.07% sol. Al, and 0.01% or less N on a mass basis, the remainder being Fe and inevitable impurities. The finish rolling is one in which the finishing start temperature is 950° C. or lower and the finishing end temperature ranges from 820° C. to 920° C. The coiling temperature at which the hot-rolled steel strip is coiled ranges from 650° C. to 800° C. The pipe-manufacturing step is performed at room temperature.

(2) In the method of manufacturing the low-yield ratio high-strength electric resistance welded steel pipe specified in Item (1), the composition further contains one or more selected from 0.03% to 0.4% Cu, 0.03% to 0.3% Ni, and 0.001% to 0.005% Sn on a mass basis in addition to the composition.

(3) In the method of manufacturing the low-yield ratio high-strength electric resistance welded steel pipe specified in Item (1) or (2), the composition further contains 0.001% to 0.003% Ca on a mass basis in addition to the composition.

(4) A low-yield ratio high-strength electric resistance welded steel pipe with excellent quality homogeneity has a composition containing 0.38% to 0.45% C, 0.1% to 0.3% Si, 1.0% to 1.8% Mn, 0.03% or less P, 0.03% or less S, 0.01% to 0.07% sol. Al, and 0.01% or less N on a mass basis, the remainder being Fe and inevitable impurities and also has high strength, that is, a yield strength YS of 379 MPa to 552 MPa and a tensile strength TS of 655 MPa or more and low yield ratio, that is, a yield ratio of 80% or less.

(5) In the low-yield ratio high-strength electric resistance welded steel pipe specified in Item (4), the composition further contains one or more selected from 0.03% to 0.4% Cu, 0.03% to 0.3% Ni, and 0.001% to 0.005% Sn on a mass basis in addition to the composition.

(6) In the low-yield ratio high-strength electric resistance welded steel pipe specified in Item (4) or (5), the composition further contains 0.001% to 0.003% Ca on a mass basis in addition to the composition.

(7) A method of manufacturing a hot-rolled steel strip capable of manufacturing the electric resistance welded steel pipe at room temperature specified in Items (1) to (3) in a pipe-manufacturing step in which continuous supplying is performed, a substantially cylindrical open pipe is formed by roll forming, and circumferential end portions of the open pipe are aligned against each other and are subjected to electric resistance welding.

(8) A hot-rolled steel strip capable of manufacturing the electric resistance welded steel pipe at room temperature specified in Items (4) to (6) in a pipe-manufacturing step in which continuous supplying is performed, a substantially cylindrical open pipe is formed by roll forming, and circumferential end portions of the open pipe are aligned against each other and are subjected to electric resistance welding.

(9) A method of manufacturing a hot-rolled steel strip for electric resistance welded steel pipes includes a hot rolling step in which a steel material is heated and is formed into a hot-rolled steel strip by rough rolling and finish rolling and the hot-rolled steel strip is coiled and a pipe-manufacturing step in which the coiled hot-rolled steel strip is continuously supplied and is formed into a substantially cylindrical open pipe by roll forming and circumferential end portions of the open pipe are aligned against each other and are subjected to electric resistance welding. The steel material has a composition containing 0.38% to 0.45% C, 0.1% to 0.3% Si, 1.0% to 1.8% Mn, 0.03% or less P, 0.03% or less S, 0.01% to 0.07% sol. Al, and 0.01% or less N on a mass basis, the remainder being Fe and inevitable impurities. The finish rolling is one in which the finishing start temperature is 950° C. or lower and the finishing end temperature ranges from 820° C. to 920° C. The coiling temperature at which the hot-rolled steel strip is coiled ranges from 650° C. to 800° C.

(10) In the method of manufacturing the hot-rolled steel strip for the electric resistance welded steel pipes specified in Item (9), the composition further contains one or more selected from 0.03% to 0.4% Cu, 0.03% to 0.3% Ni, and 0.001% to 0.005% Sn on a mass basis in addition to the composition.

(11) In the method of manufacturing the hot-rolled steel strip for the electric resistance welded steel pipes specified in Item (9) or (10), the composition further contains 0.001% to 0.003% Ca on a mass basis in addition to the composition.

The following pipe can be stably and readily manufactured without hot diameter-reducing rolling or rotating roller straightening after pipe manufacturing: a low-yield ratio high-strength electric resistance welded steel pipe having a small variation in quality such as strength, low yield ratio, that is, a yield ratio of 80% or less, and high strength, that is, a yield strength YS of 379 MPa to 552 MPa and a tensile strength TS of 655 MPa or more. This is industrially particularly advantageous.

DETAILED DESCRIPTION

We provide a method of manufacturing a low-yield ratio high-strength electric resistance welded steel pipe with excellent quality homogeneity. The method can manufacture an electric resistance welded steel pipe having a small variation in quality such as strength, low yield ratio, that is, a yield ratio of 80% or less, and high strength, that is, a yield strength YS of 379 MPa to 552 MPa and a tensile strength TS of 655 MPa or more from a solid solution-hardened hot-rolled steel sheet (solid solution-hardened hot-rolled steel strip) without heating during pipe manufacturing and hot diameter-reducing rolling or rotating roller straightening after pipe manufacturing. The term "a small variation in quality" means that, for example, the variation in tensile strength TS is less than 20 MPa.

We investigated the longitudinal variation in strength (quality) of electric resistance welded steel pipes manufactured from a coiled hot-rolled steel sheet (hot-rolled steel strip).

A steel material having a composition containing 0.39% C, 0.24% Si, 1.37% Mn, 0.017% P, 0.005% S, 0.041% sol. Al, and 0.0042% N on a mass basis, the remainder being Fe and inevitable impurities, was heated to a heating temperature of 1,220° C. and rolled into a hot-rolled steel sheet (hot-rolled steel strip) with a thickness of 12.4 mm by hot rolling including rough rolling and finish rolling in which the finishing entry temperature was 930° C. and the finishing delivery temperature was 860° C., followed by coiling at a coiling temperature of 620° C. After an obtained coil was continuously supplied (rewound) and was formed into substantially cylindrical open pipes at room temperature by continuous forming using rolls, end portions thereof were aligned against each other and subjected to electric resistance welding, whereby electric resistance welded steel pipes with an outside diameter of 508 mm φ were obtained.

Tensile test specimens (rectangular specimens with a width of 38 mm) were taken from the obtained electric resistance welded steel pipe of those locations: the outer wrap (10 m apart from the trailing end of the coil) of the coil, a central portion (120 m apart from the trailing end of the coil) of the coil, and the inner wrap (10 m apart from the leading end of the coil) of the coil in the coil, such that a tensile direction coincided with a longitudinal direction of the coil (a longitudinal direction of the pipe), followed by tensile testing, whereby tensile properties (yield strength YS, tensile strength TS, and elongation EL) were determined in accordance with ASTM A370 standard.

Figure 1:
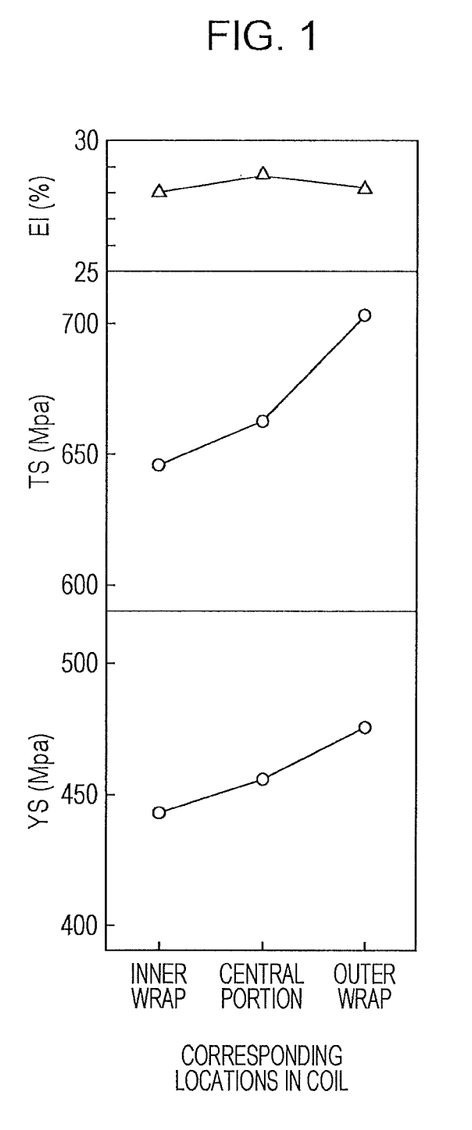
FIG. 1 is a graph showing the influence of test specimen-sampling locations (coil locations) affecting longitudinal tensile properties of an electric resistance welded steel pipe.

Obtained results are shown in FIG. 1. As is clear from FIG. 1, longitudinal tensile properties of the obtained electric resistance welded steel pipes vary significantly depending on locations in the coil in spite of performing pipe manufacturing using the single coil (hot-rolled steel sheet (steel strip)) with few variations in manufacturing conditions. The electric resistance welded steel pipe manufactured from the inner wrap of the coil has significantly low strength (YS, TS) compared to the electric resistance welded steel pipe manufactured from the outer wrap of the coil.

Therefore, we investigated the cause of the longitudinal variation in strength of the pipes. We found that the variation in strength thereof is caused by residual strain remaining during coiling.

This is probably due to the mechanism below.

When a steel strip is coiled with such a low coiling temperature that recrystallization having been completed, strain (coiling strain) during coiling is not released and the steel strip is cooled with compression strain remaining in a longitudinal direction of the steel strip. Therefore, performing tensile testing after cooling causes a reduction in tensile strength due to the Bauschinger effect. The larger the remaining compression strain is, the larger the reduction in strength is. Accordingly, it is conceivable that the inner wrap of a coil has a smaller coiled curvature radius and therefore has a larger residual strain and a larger reduction in strength.

The variation in strength due to the mechanism is remarkable in solid solution-hardened steel sheets, particularly in hard materials. In precipitation-hardened steel sheets, the influence of precipitation strengthening by fine precipitates is large and therefore the variation in strength due to the mechanism is hidden and does not appear. In soft materials among the solid solution-hardened steel sheets, the influence of precipitation strengthening by the precipitation of AlN is large and therefore the variation in strength due to the mechanism is hidden.

In addition, the mechanism is remarkable in performing tensile testing such that a tensile direction coincides with a longitudinal direction of a coil (steel strip). However, we found that the mechanism does not appear in the case of performing tensile testing such that the tensile direction coincides with a transverse to the rolling direction and is unlikely to appear in local testing like hardness measurement.

Therefore, we conducted further investigations. As a result, we found that when the coiling temperature is limited to high temperature (650° C. or higher), the strain is released by recovery after the coiling preventing the variation in strength due to the mechanism. As a result of further investigations, we found that the strength reduction due to high coiling temperature can be avoided such that finish rolling is set in the non-recrystallization temperature region of austenite by grain refinement.

First, basic experiment results are described.

Slabs (steel materials) having a composition containing 0.39% C, 0.24% Si, 1.37% Mn, 0.017% P, 0.005% S, 0.041% sol. Al, and 0.0042% N on a mass basis, the remainder being Fe and inevitable impurities, were heated to a heating temperature of 1,200° C. to 1,240° C. and subjected to rough rolling and then finish rolling in which the finishing entry temperature (finishing start temperature) FET was varied and the finishing delivery temperature (finishing end temperature) FDT was 910° C. to 880° C., followed by coiling at various coiling temperatures CT, whereby hot-rolled steel strips (a thickness of 12.7 mm) were obtained. Each obtained hot-rolled steel strip (coil) was uncoiled and formed into substantially cylindrical open pipes by continuous cold forming using rolls. Circumferential end portions of each open pipe were aligned against each other using squeeze rolls, followed by a pipe manufacturing process of performing electric resistance welding by high-frequency resistance welding, whereby an electric resistance welded steel pipe (an outside diameter of 508 mm φ and a thickness of 12.7 mm) was obtained.

Tensile test specimens (rectangular specimens with a width of 38 mm) were taken from the obtained electric resistance welded steel pipe of those locations: the outer wrap (10 m apart from the trailing end of the coil) of the coil, a central portion (60 m apart from the trailing end of the coil) of the coil, and the inner wrap (10 m apart from the leading end of the coil) of the coil in the coil such that a tensile direction coincided with a longitudinal direction of the coil (a longitudinal direction of the pipe), followed by tensile testing, whereby the tensile strength TS was determined in accordance with ASTM A370 standard. The electric resistance welded steel pipes manufactured from the single coil were measured for tensile strength TS, from which the difference ΔTS between the maximum and the minimum was calculated.

Figure 2:
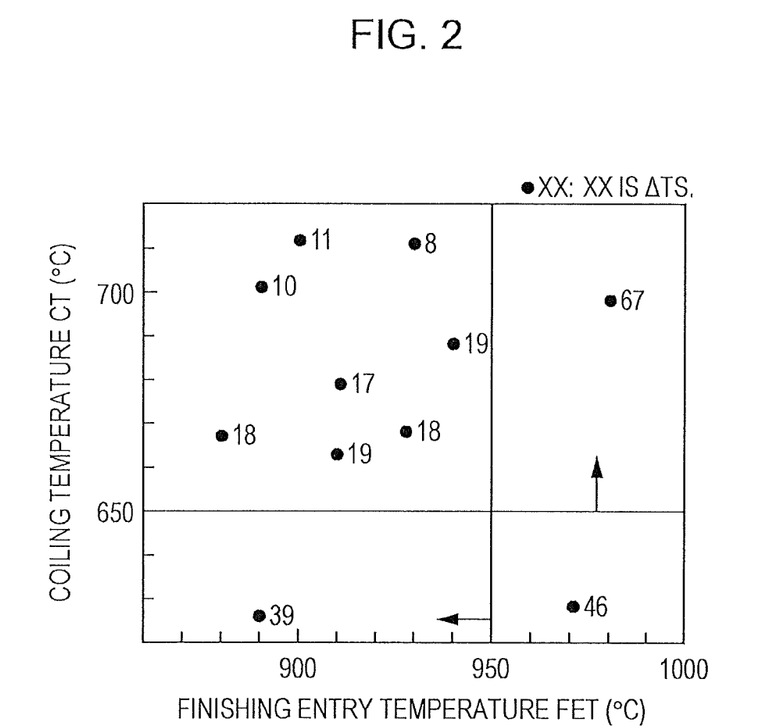
FIG. 2 is a graph showing the relationship between the coiling temperature and finishing entry temperature (finishing start temperature) FET affecting the variation ΔTS ((the maximum of TS)−(the minimum of TS)) in tensile strength TS.

FIG. 2 shows the relationship between the coiling temperature CT and finishing entry temperature FET affecting ΔTS.

As is clear from FIG. 2, only when it is satisfied that the finishing entry temperature FET is 950° C. or lower and the coiling temperature CT is 650° C. or higher, ΔTS is 20 MPa or less, that is, the variation in strength is small. We found that only the use of a hot-rolled steel strip (coil) manufactured to satisfy CT and FET as described above as a pipe material allows an electric resistance welded steel pipe with excellent quality homogeneity to be manufactured.

The following materials are used: a steel material having a composition containing 0.38% to 0.45% C, 0.1% to 0.3% Si, 1.0% to 1.8% Mn, 0.03% or less P, 0.03% or less S, 0.01% to 0.07% sol. Al, and 0.01% or less N on a mass basis, the remainder being Fe and inevitable impurities.

First, reasons for limiting the composition of the steel material are described. Mass percent is simply denoted by % unless otherwise specified.

C: 0.38% to 0.45%

C is an element increasing the strength of steel. 0.38% or more needs to be contained to ensure desired high strength. However, containing more than 0.45% is likely to produce martensite in sites where the temperature is locally reduced by remaining water on the strip or the like in the course of cooling subsequent to hot rolling and is likely to cause the variation in quality such as strength. Therefore, C is limited to 0.38% to 0.45%.

Si: 0.1% to 0.3%

Si is an element which acts as a deoxidizing agent and has the effect of increasing the strength of steel by solid solution hardening and can adjust the content of Al to a low level to reduce the adverse effect of Al. To achieve such effects, 0.1% or more needs to be contained. However, containing more than 0.3% causes a large amount of red scale on the surface of steel sheet. A site having the red scale is locally rapidly cooled during cooling subsequent to hot rolling to cause a variation in quality such as strength. Therefore, Si is limited to 0.1% to 0.3%.

Mn: 1.0% to 1.8%

Mn is an element which increases the strength of steel through solid solution hardening or the increase of hardenability. 1.0% or more needs to be contained to ensure desired high strength. However, containing more than 1.8% increases segregation and the variation in quality such as strength because hardenability is excessively increased and martensite is likely to be formed. Therefore, Mn is limited to 1.0% to 1.8%.

P: 0.03% or less

P is an element which forms a solid solution to increase the strength of steel. P is likely to be segregated at grain boundaries or the like to cause the non-homogeneity of quality. Therefore, P is preferably minimized as an inevitable impurity and up to 0.03% is acceptable. Therefore, P is limited to 0.03% or less. P is preferably 0.002% or less.

S: 0.03% or less

S is likely to form the sulfide MnS in steel and is likely to act as a precipitation site of AlN. Since the precipitation of AlN affects increases in strength, S affects the increase of the variation in strength. Such an influence is remarkable when more than 0.03% S is contained. Therefore, S is limited to 0.03% or less. S is preferably 0.005% or less. When AlN is co-precipitated with MnS, the influence is small.

sol. Al: 0.01% to 0.07%

Al is an element acting as a deoxidizing agent. To achieve such an effect, 0.01% or more needs to be contained.

However, containing more than 0.07% causes the increase of the amount of AlN, leading to the occurrence of the variation in strength due to the precipitation of AlN. Therefore, sol. Al is limited to 0.01% to 0.07%.

N: 0.01% or less

N is inevitably contained in steel, forms a solid solution to contribute to an increase in strength, combines with Al to form AlN, and affects the increase in strength through precipitation of AlN. When the content is large, more than 0.01%, the inhomogeneous precipitation of AlN is likely to occur in a coil and the variation in strength is caused. Therefore, N is limited to 0.01% or less.

The above components are fundamental components. The composition may further selectively contain one or more selected from 0.03% to 0.4% Cu, 0.03% to 0.3% Ni, and 0.001% to 0.005% Sn and/or 0.001% to 0.003% Ca as a selective element as required in addition to the fundamental composition.

One or more selected from 0.03% to 0.4% Cu, 0.03% to 0.3% Ni, and 0.001% to 0.005% Sn All Cu, Ni, and Sn are solid solution hardening elements that contribute to an increase in strength without impairing the low yield ratio and one or more thereof may be selectively contained as required. To achieve such an effect, 0.03% or more Cu, 0.03% or more Ni, or 0.001% or more Sn is preferably contained. Containing more than 0.4% Cu, more than 0.3% Ni, or more than 0.005% Sn causes a reduction in toughness.

Ca is an element having the effect of controlling the morphology of sulfides and 0.001% to 0.003% may be contained.

Ca: 0.001% to 0.003%

Ca is an element having such a sulfide morphology control effect that elongated sulfides are changed into spherical sulfides. 0.001% or more is preferably contained to achieve such an effect. However, containing more than 0.003% deteriorates cleanness of steel and is likely to cause cracking due to inclusions during pipe manufacturing; hence, it is preferably limited to 0.003% or less. Therefore, Ca is preferably limited to 0.001% to 0.003%.

A method of manufacturing a steel pipe is described below. The steel material having the above composition is used as a starting material.

The remainder other than the above components are Fe and inevitable impurities. As the inevitable impurities, 0.1% or less Cr, 0.1% or less Co, 0.01% or less Ti, 0.01% or less Nb, 0.01% or less V, 0.05% or less Mo, and 0.001% or less B are acceptable.

A method of producing the steel material having the above composition is not particularly limited. The steel material such as a slab, is preferably obtained using a production means such as a converter, usually used, preferably a casting means such as continuous casting. In addition, soft reduction or electromagnetic stirring is preferably used to prevent segregation.

The steel material having the above composition is first subjected to a hot rolling step. In the hot rolling step, the steel material is heated and hot-rolled into a hot-rolled steel strip by rough rolling and finish rolling, followed by coiling after finish rolling.

The heating temperature of the steel material is preferably 1,200° C. to 1,280° C. The steel material may be heated without cooling or such that the steel material is once cooled to room temperature and then reheated. When the heating temperature thereof is lower than 1,200° C., it is difficult to sufficiently redissolve coarse MnS and AlN. Therefore, reprecipitation occurs on the undissolved MnS and AlN during hot rolling to increase the variation in strength in a coil. The coexistence of coarse precipitates undissolved during hot rolling and fine precipitates precipitated during hot rolling increases the variation in strength.

However, when the temperature is high, higher than 1,280° C., austenite grains are coarsened, a martensite phase is likely to be formed after hot rolling, the strength is locally high, and the variation in strength increases. Therefore, in the hot rolling step, the heating temperature of the steel material is preferably 1,200° C. to 1,280° C.

The heated steel material is subjected to hot rolling including rough rolling and finish rolling. Conditions for rough rolling are not particularly limited and may be those capable of manufacturing a sheet bar having a predetermined size and shape. The sheet bar preferably has a thickness of 45 mm or more from the viewpoint of ensuring the rolling reduction ratio in the non-recrystallization temperature region of austenite during finish rolling. Incidentally, after being coiled once, the sheet bar may be subjected to finish rolling.

Finish rolling is one in which the finishing entry temperature (finishing start temperature) FET is 950° C. or lower and the finishing delivery temperature (finishing end temperature) FDT ranges from 820° C. to 920° C.

Finishing entry temperature (finishing start temperature) FET: 950° C. or lower

The finishing entry temperature (finishing start temperature) FET is controlled to be low, 950° C. or lower, whereby finish rolling is performed in the non-recrystallization temperature region of austenite. The lower limit of the FET is preferably 900° C. or higher from the viewpoint of ensuring a desired finishing end temperature. This allows grains to be refined, thereby ensuring desired high strength. However, when the finishing entry temperature (finishing start temperature) FET is high, higher than 950° C., grains cannot be refined, thereby causing insufficient strength.

As a method of controlling the FET to be low, 950° C. or lower, the following can be exemplified: increasing the number of passes during rough rolling, holding finish rolling as the roughly rolled sheet bar until a desired finishing start temperature is achieved, performing water cooling between rough rolling and finish rolling, or the like. Finishing delivery temperature (finishing end temperature) FDT: 820° C. to 920° C.

When the finishing delivery temperature (finishing end temperature) FDT is lower than 820° C., finish rolling is rolling at lower than the transformation temperature and therefore a large difference in strength is likely to be caused due to the difference in microstructure between an end portion (edge portion) and central portion (center portion) of a steel sheet, thereby causing insufficient strength. However, when the finishing end temperature is high, higher than 920° C., the austenite grains are coarsened, the martensite phase is likely to be produced even if the coiling temperature is increased, and the variation in strength is likely to be caused. Therefore, the finishing delivery temperature (finishing end temperature) FDT is limited to 820° C. to 920° C.

To ensure the finishing delivery temperature (finishing end temperature) FDT, the whole or an end portion (edge portion) of the sheet bar may be heated with an induction heating apparatus or the like before finish rolling. The term "finish rolling temperature" refers to the surface temperature determined with a radiation thermometer.

The hot-rolled steel strip is cooled on a run-out table during the period from the completion of finish rolling to coiling. The strip may be cooled at a cooling rate of 50° C./sec. or more from the viewpoint of enhancing the accuracy of the coiling temperature.

After finish rolling, the hot-rolled steel strip is coiled. The coiling temperature ranges from 650° C. to 800° C.

Coiling temperature: 650° C. to 800° C.

When the coiling temperature is lower than 650° C., martensite may possibly be formed during cooling subsequent to the completion of finish rolling and the variation in strength tends to increase. However, when the coiling temperature is high, higher than 800° C., coarse AlN is precipitated, grains are coarsened, and the variation in strength tends to increase. Therefore, the temperature (coiling temperature) at which the hot-rolled steel strip is coiled is limited to 650° C. to 800° C. The coiling temperature is preferably 690° C. to 730° C.

The coiled steel strip is cooled to room temperature. After being cooled to 400° C. or lower, a coil may be water-cooled to reduce the cooling time. After cooling to 400° C. or lower, no martensite may possibly be formed by water cooling.

The coiled hot-rolled steel strip is continuously supplied and then subjected to a pipe-manufacturing step at room temperature without being heated.

In the pipe-manufacturing step, the hot-rolled steel strip continuously supplied is first formed into a substantially cylindrical open pipe. The forming temperature is room temperature. Formation of the open pipe is preferably continuously performed using, for example, a roll-forming machine including a plurality of breakdown rolls, cage-forming rolls, fin pass rolls, or the like arranged in series and, of course, is not limited to such methods. Circumferential end portions of the substantially cylindrically formed open pipe are aligned against each other using squeeze rolls. The aligned portions are subjected to electric resistance welding by high-frequency resistance welding or the like, whereby an electric resistance welded steel pipe is obtained.

Only a weld zone (seam portion) formed by electric resistance welding may be subjected to heat treatment (seam annealing) by heating the weld zone to about 900° C. to 1,050° C. to improve the microstructure.

After the pipe-manufacturing step, the obtained electric resistance welded steel pipe may be subjected to diameter-reducing rolling with a reduction of diameter of 0.3% to 5% at room temperature for the purpose of shape sizing. When the reduction of diameter is less than 0.3%, the desired purpose, that is, shape sizing cannot be achieved. However, when the reduction of diameter is large, more than 5%, cracking is likely to occur. Therefore, the reduction of diameter preferably ranges from 0.3% to 5% and is more preferably 1.5% or less.

EXAMPLES

Molten steels with a composition shown in Table 1 were each produced with a converter and were cast into slabs (steel materials) by a continuous casting process. The slabs were subjected to a hot rolling step including heating at a heating temperature of 1,210° C. to 1,240° C., rough rolling at a temperature of 970° C. to 1,000° C., hot rolling including finish rolling under conditions shown in Table 2, and coiling at a coiling temperature shown in Table 2, whereby hot-rolled steel strips (a thickness of 12.4 mm) were obtained. The coiled hot-rolled steel strips were uncoiled and formed into substantially cylindrical open pipes by continuous forming using roll. Circumferential end portions of each open pipe were aligned against each other using squeeze rolls, followed by a pipe-manufacturing step of performing electric resistance welding by high-frequency resistance welding, whereby an electric resistance welded steel pipe (an outside diameter of 508 mm $\phi$ and a thickness of 12.7 mm) was obtained. An electric resistance weld zone only was subjected to heat treatment (seam annealing) by heating the electric resistance weld zone to about 980° C. in order to improve the microstructure. After the pipe manufacturing, diameter-reducing rolling was performed with a reduction of diameter of 0.6% at room temperature using a sizer, whereby shape sizing was performed.

Tensile test specimens (a width of 38 mm) were cut out of each obtained electric resistance welded steel pipe such that a longitudinal direction of the pipe coincided with a tensile direction, followed by tensile testing, whereby tensile properties (yield strength YS, tensile strength TS, and elongation EL) were determined in accordance with ASTM A370 standard. Incidentally, the tensile test specimens were taken from locations corresponding to locations (the outer wrap (10 m apart from the trailing end of a coil) of the coil, a central portion (60 m apart from the trailing end of the coil) of the coil, and the inner wrap (10 m apart from the leading end of the coil) of the coil) in the single coil.

The difference $\Delta TS$ between the maximum and the minimum was calculated from the tensile strength TS obtained in each location in a longitudinal direction of the coil, whereby the variation in quality (variation in strength) of the coil was evaluated.

Obtained results are shown in Table 3.

Our examples all provide electric resistance welded steel pipes having a small variation in quality, that is, a $\Delta TS$ of less than 20 MPa, low yield ratio, that is, a yield ratio of 80% or less, and high strength, that is, a yield strength YS of 379 MPa to 552 MPa and a tensile strength TS of 655 MPa or more without heating during pipe manufacturing and hot diameter-reducing rolling or rotating roller straightening after pipe manufacturing. However, comparative examples outside our scope exhibit a large variation in quality, that is, a $\Delta TS$ of 20 MPa or more or cannot stably satisfy a desired high strength (a TS of 655 MPa or more).

In Steel Pipe No. 2, the TS of the inner wrap of a coil is outside our scope and $\Delta TS$ is large because the finishing start temperature exceeds 950° C., which is an upper limit in the present invention.

Furthermore, in Steel Pipe No. 3, $\Delta TS$, the TS of a central portion of a coil, and that of the inner wrap of the coil are outside our scope because the coiling temperature falls below 650° C., which is a lower limit in the present invention. In Steel Pipe No. 5, $\Delta TS$, the TS of a central portion of a coil, and that of the inner wrap of the coil are outside our scope because C and Mn in the composition of a steel sheet are less than lower limits. In Steel Pipe No. 7, the TS of a central portion of a coil and that of the inner wrap of the coil are outside our scope because the finishing end temperature falls below 820° C., which is our lower limit.

TABLE 1

| Steel No. | Chemical compositions (mass percent) | | | | | | | | | Remarks |
|---|---|---|---|---|---|---|---|---|---|---|
| | C | Si | Mn | P | S | sol. Al | N | Cu, Ni, Sn | Ca | |
| A | 0.42 | 0.20 | 1.3 | 0.014 | 0.002 | 0.022 | 0.0034 | — | — | Adequate example |
| B | 0.39 | 0.14 | 1.7 | 0.009 | 0.014 | 0.036 | 0.0038 | — | 0.0022 | Adequate example |
| C | 0.34 | 0.22 | 0.9 | 0.023 | 0.006 | 0.064 | 0.0049 | — | — | Comparative example |
| D | 0.42 | 0.29 | 1.3 | 0.009 | 0.003 | 0.036 | 0.0053 | Cu: 0.08, Ni: 0.06, Sn: 0.002 | 0.0019 | Adequate example |

TABLE 2

| Steel pipe No. | Steel No. | Hot rolling step | | | Remarks |
|---|---|---|---|---|---|
| | | Finishing start temperature (° C.) | Finishing end temperature (° C.) | Coiling temperature (° C.) | |
| 1 | A | 900 | 859 | 712 | Inventive example |
| 2 | A | 980 | 884 | 698 | Comparative example |
| 3 | A | 890 | 830 | 630 | Comparative example |
| 4 | B | 880 | 830 | 667 | Inventive example |
| 5 | C | 920 | 891 | 663 | Comparative example |
| 6 | D | 930 | 842 | 713 | Inventive example |
| 7 | D | 910 | 795 | 663 | Comparative example |

TABLE 3

| Steel pipe No. | Steel No. | Test specimen-sampling locations (corresponding locations in coil) | Tensile properties | | | Quality homogeneity ΔTS (MPa) | Remarks |
|---|---|---|---|---|---|---|---|
| | | | YS (MPa) | TS (MPa) | El (%) | | |
| 1 | A | Outer wrap | 464 | 699 | 24 | 11 | Inventive example |
| | | Central portion | 470 | 710 | 24 | | |
| | | Inner wrap | 480 | 704 | 25 | | |
| 2 | A | Outer wrap | 483 | 709 | 26 | 67 | Comparative example |
| | | Central portion | 476 | 710 | 25 | | |
| | | Inner wrap | 413 | 643 | 28 | | |
| 3 | A | Outer wrap | 408 | 685 | 27 | 36 | Comparative example |
| | | Central portion | 425 | 649 | 28 | | |
| | | Inner wrap | 416 | 652 | 29 | | |
| 4 | B | Outer wrap | 459 | 700 | 25 | 18 | Inventive example |
| | | Central portion | 456 | 692 | 26 | | |
| | | Inner wrap | 468 | 710 | 24 | | |
| 5 | C | Outer wrap | 425 | 688 | 25 | 45 | Comparative example |
| | | Central portion | 419 | 649 | 27 | | |
| | | Inner wrap | 423 | 643 | 26 | | |
| 6 | D | Outer wrap | 460 | 701 | 24 | 6 | Inventive example |
| | | Central portion | 453 | 704 | 25 | | |
| | | Inner wrap | 438 | 698 | 25 | | |
| 7 | D | Outer wrap | 470 | 664 | 25 | 19 | Comparative example |
| | | Central portion | 432 | 648 | 26 | | |
| | | Inner wrap | 426 | 645 | 26 | | |

The invention claimed is:

1. A low-yield ratio high-strength electric resistance welded steel pipe having a composition comprising 0.38% to 0.45% C, 0.1% to 0.3% Si, 1.0% to 1.8% Mn, 0.03% or less P, 0.03% or less S, 0.01% to 0.07% sol. Al, and 0.01% or less N on a mass basis, the remainder being Fe and inevitable impurities, the low-yield ratio high-strength electric resistance welded steel pipe having high strength comprising a yield strength YS of 379 MPa to 552 MPa, a tensile strength TS of 655 MPa or more and a low yield ratio comprising a yield ratio of 80% or less and a TS variation ΔTS ((the maximum of TS)–(the minimum of TS)) is less than 20 MPa.

2. The welded steel pipe according to claim 1, wherein the composition further comprises one or more selected from 0.03% to 0.4% Cu, 0.03% to 0.3% Ni, and 0.001% to 0.005% Sn on a mass basis in addition to the composition.

3. The welded steel pipe according to claim 2, wherein the composition further comprises 0,001% to 0.003% Ca on a mass basis in addition to the composition.

4. The welded steel pipe according to claim 1, wherein the composition further comprises 0.001% to 0.003% Ca on a mass basis in addition to the composition.

5. A method of manufacturing the electric resistance welded steel pipe according to claim 1 comprising:

a hot rolling step in which a steel material is heated and formed into a hot-rolled steel strip by rough rolling and finish rolling and the hot-rolled steel strip is coiled; and a pipe-manufacturing step in which the coiled hot-rolled steel strip is continuously supplied and formed into a substantially cylindrical open pipe by roll forming and circumferential end portions of the open pipe are aligned against each other and subjected to electric resistance welding, wherein the steel material has a composition comprising 0.38% to 0.45% C, 0.1% to 0.3% Si, 1.0% to 1.8% Mn, 0.03% or less P, 0.03% or less S, 0.01% to 0.07% sol. Al, and 0.01% or less N on a mass basis, the remainder being Fe and inevitable impurities, the finish rolling has a finishing start temperature of 950° C. or lower and the finishing end temperature is 820° C. to 920° C., the coiling temperature at which the hot-rolled steel strip is coiled is 650° C. to 800° C.; and the pipe-manufacturing step is performed at room temperature.

6. The method according to claim 5, wherein the composition further comprises 0.001% to 0.003% Ca on a mass basis in addition to the composition.

7. The method according to claim 5, wherein the composition further comprises one or more selected from 0.03% to 0.4% Cu, 0.03% to 0.3% Ni, and 0.001% to 0.005% Sn on a mass basis in addition to the composition.

8. The method according to claim 7, wherein the composition further comprises 0.001% to 0.003% Ca on a mass basis in addition to the composition.

9. A hot-rolled steel strip having a composition comprising 0.38% to 0.45% C, 0.1% to 0.3% Si, 1.0% to 1.8% Mn, 0.03% or less P, 0.03% or less S, 0.01% to 0.07% sol. Al, and 0.01% or less N on a mass basis, the remainder being Fe and inevitable impurities, the hot-rolled steel strip being capable of being manufactured into a low-yield ratio high-strength electric resistance welded steel pipe at room temperature in a pipe-manufacturing step in which the steel strip is continuously supplied, a substantially cylindrical open pipe is formed by roll forming, and circumferential end portions of the open pipe are aligned against each other and subjected to electric resistance welding, the welded steel pipe having high strength comprising a yield strength YS of 379 MPa to 552 MPa, a tensile strength TS of 655 MPa or more, a low yield ratio comprising a yield ratio of 80% or less and a TS variation ΔTS ((the maximum of TS)−(the minimum of TS)) of less than 20 MPa.

10. A hot-rolled steel strip according to claim 9, wherein the composition further comprises 0.001% to 0.003% Ca on a mass basis.

11. A hot-rolled steel strip according to claim 9, wherein the composition further comprises one or more selected from 0.03% to 0.4% Cu, 0.03% to 0.3% Ni, and 0.001% to 0.005% Sn on a mass basis.

12. A method of manufacturing the hot-rolled steel strip according to claim 9 comprising:

a hot rolling step in which a steel material is heated and formed into a hot-rolled steel strip by rough rolling and finish rolling and the hot-rolled steel strip is coiled, wherein the steel material has a composition comprising 0.38% to 0.45% C, 0.1% to 0.3% Si, 1.0% to 1.8% Mn, 0.03% or less P, 0.03% or less S, 0.01% to 0.07% sol. Al, and 0.01% or less N on a mass basis, the remainder being Fe and inevitable impurities, the finish rolling has a finishing start temperature of 950° C. or lower, the finishing end temperature is 820° C. to 920° C., and the coiling temperature at which the hot-rolled steel strip is coiled is 650° C. to 800° C.

13. The method according to claim 12, wherein the composition further comprises one or more selected from 0.03% to 0.4% Cu, 0.03% to 0.3%Ni, and 0.001% to 0.005% Sn on a mass basis in addition to the composition.

14. The method according to claim 13, wherein the composition further comprises 0.001% to 0.003% Ca on a mass basis in addition to the composition.

15. The method pipes according to claim 12, wherein the composition further comprises 0.001% to 0.003% Ca on a mass basis in addition to the composition.

* * * * *